Feb. 26, 1952   C. J. HOLMES   2,587,159
PORTABLE GRANDSTAND
Filed Nov. 13, 1945   5 Sheets-Sheet 1
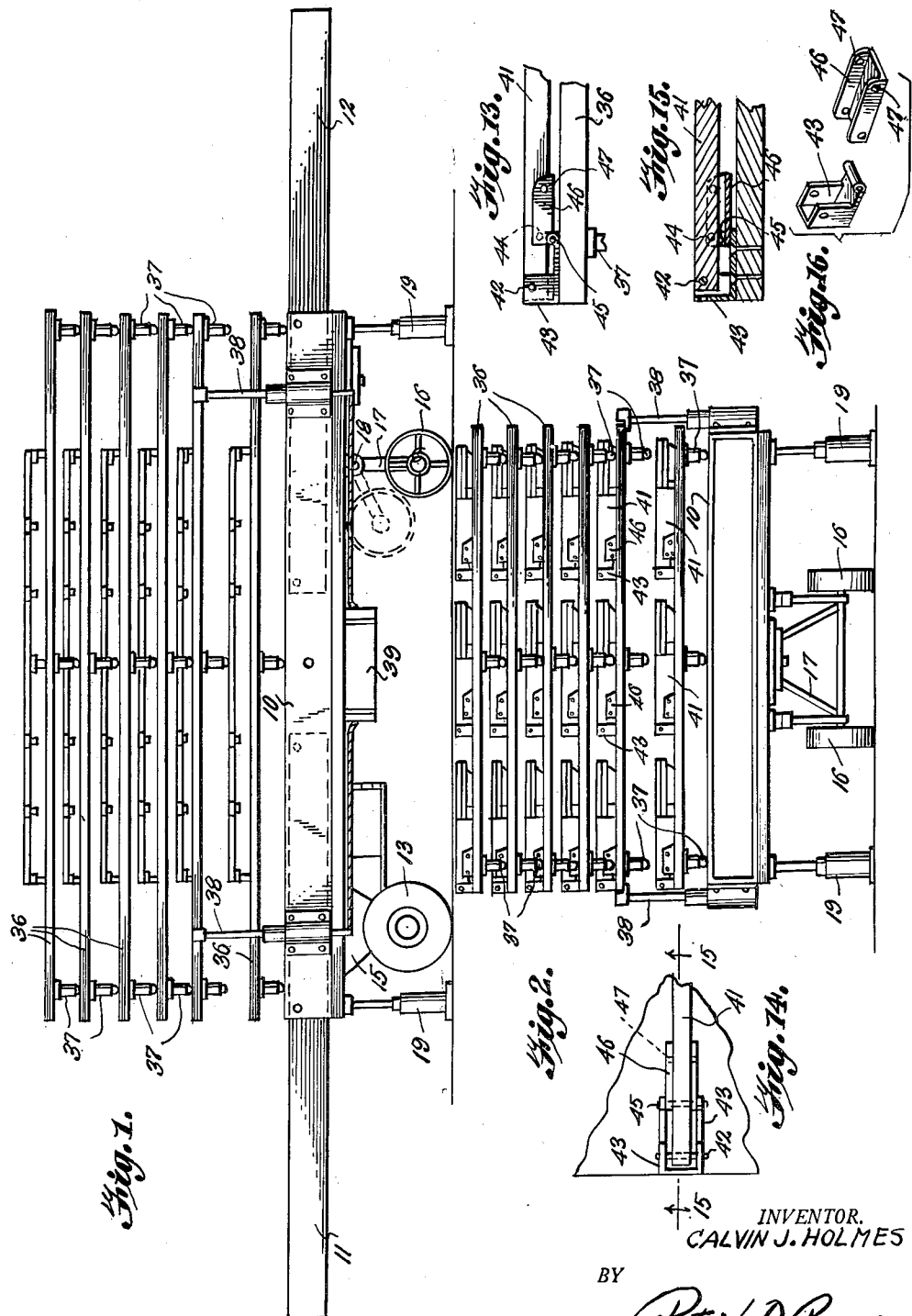
INVENTOR.
CALVIN J. HOLMES
BY
Patrick D. Beavers
ATTORNEY

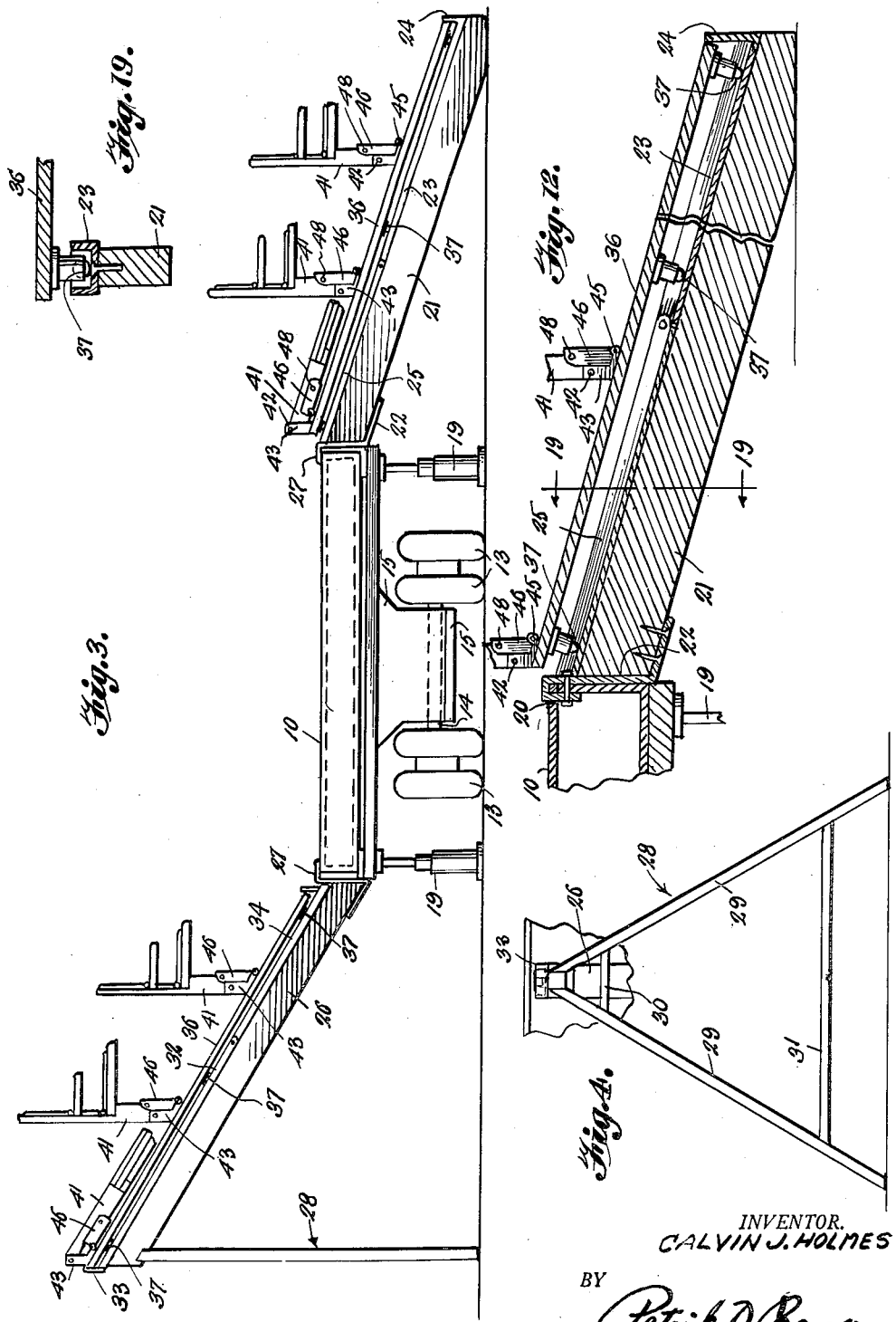

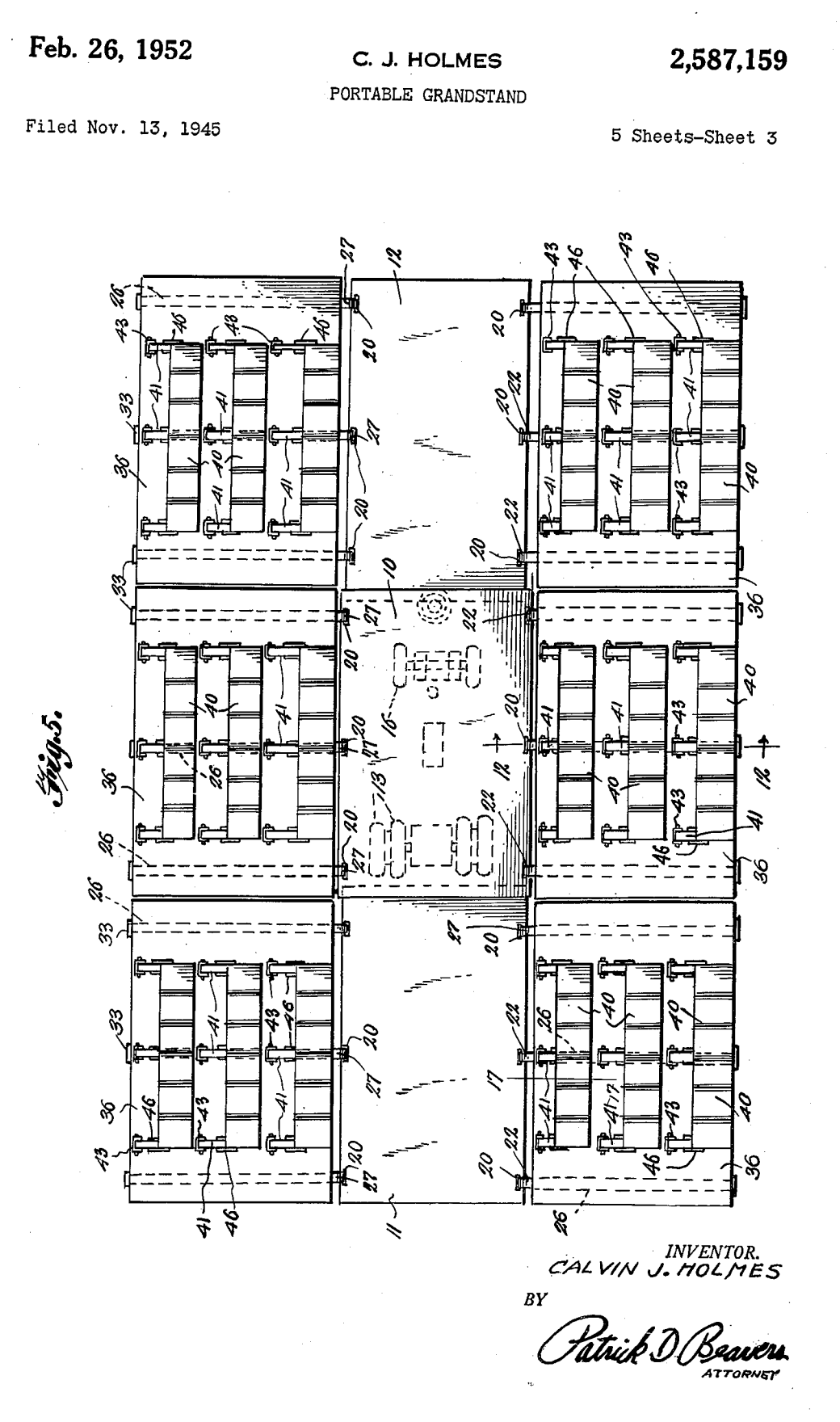

Feb. 26, 1952
C. J. HOLMES
2,587,159
PORTABLE GRANDSTAND

Filed Nov. 13, 1945
5 Sheets-Sheet 3

INVENTOR.
CALVIN J. HOLMES
BY
Patrick D. Beavers
ATTORNEY

Feb. 26, 1952   C. J. HOLMES   2,587,159
PORTABLE GRANDSTAND
Filed Nov. 13, 1945   5 Sheets-Sheet 4
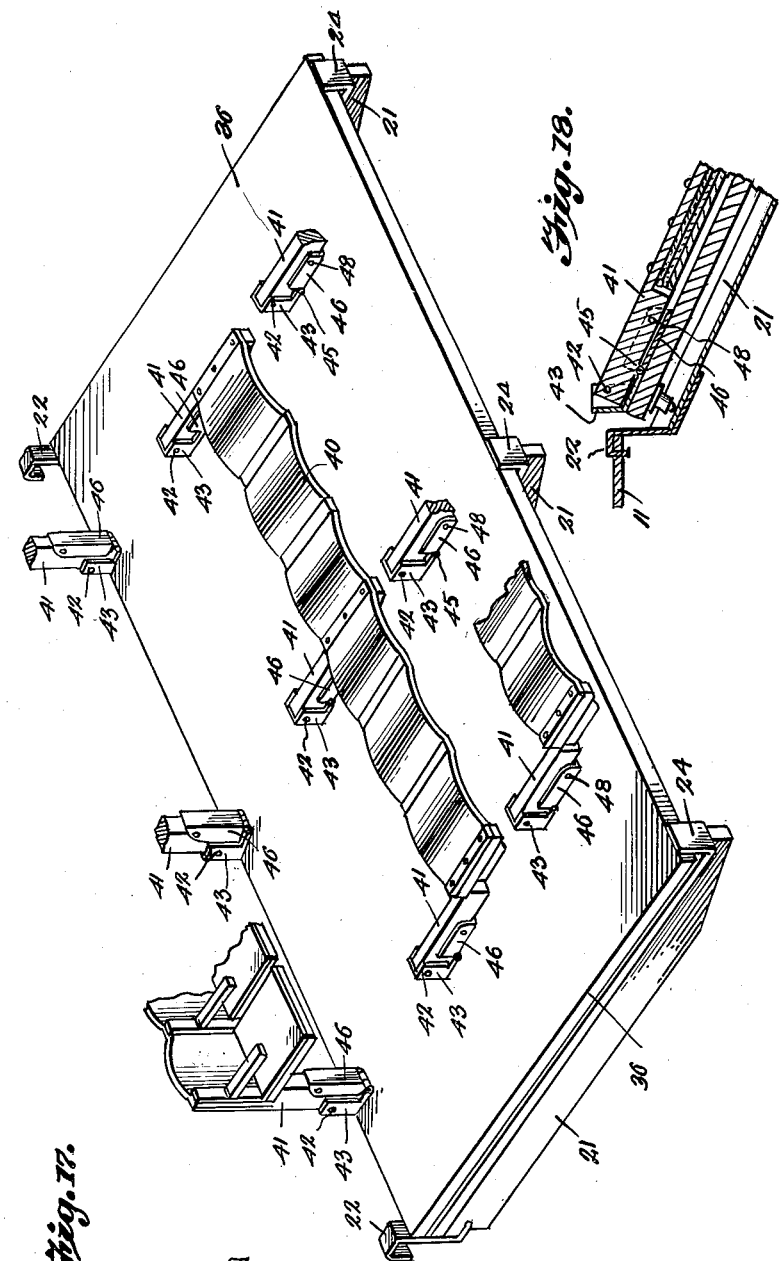
INVENTOR.
CALVIN J. HOLMES
BY
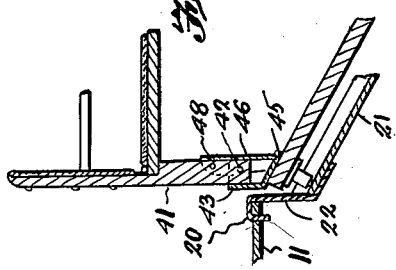
ATTORNEY

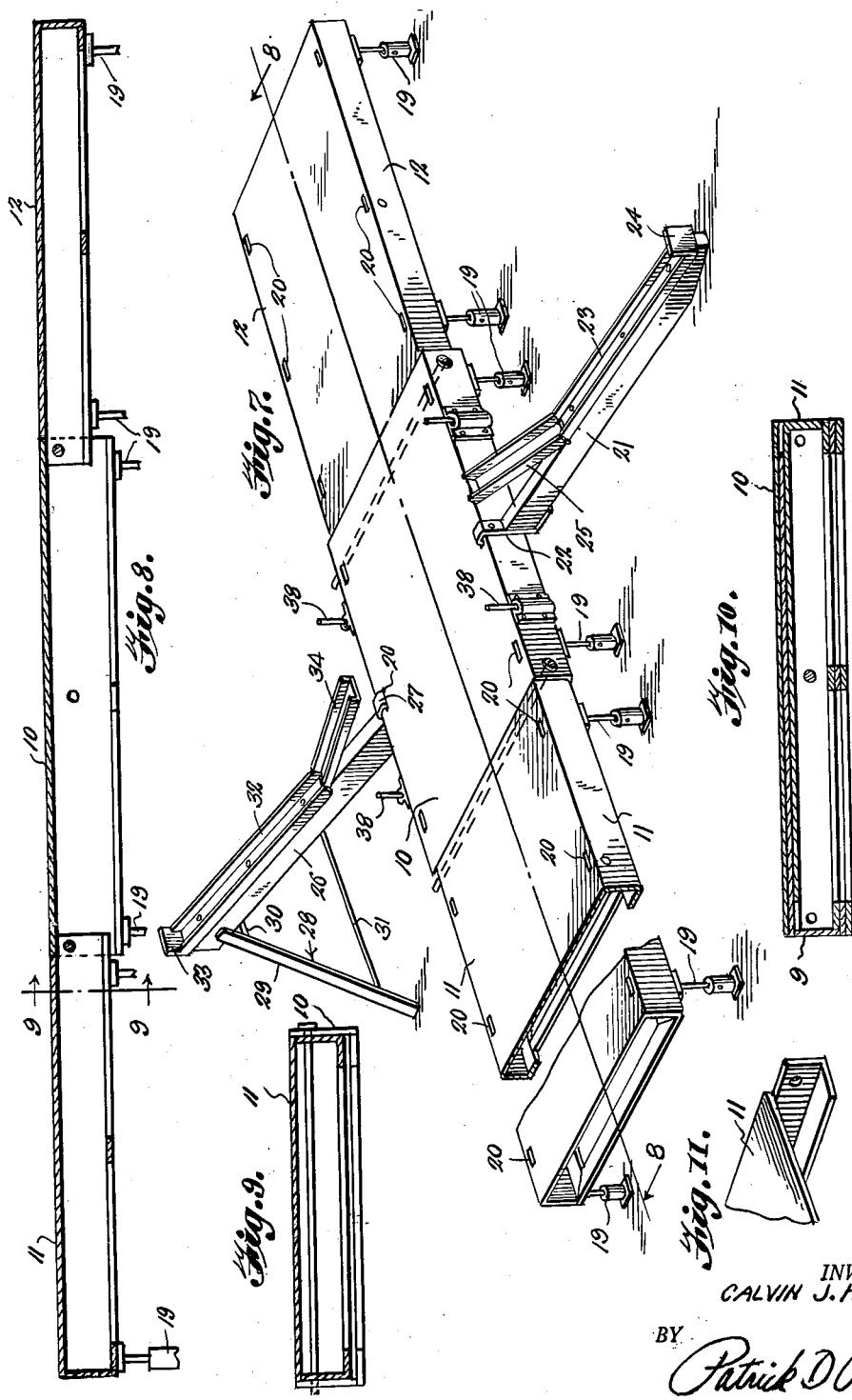

Patented Feb. 26, 1952

2,587,159

UNITED STATES PATENT OFFICE 2,587,159

PORTABLE GRANDSTAND

Calvin J. Holmes, Terre Haute, Ind.

Application November 13, 1945, Serial No. 628,008

2 Claims. (Cl. 20—1.126)

The present invention relates to a portable grandstand and it consists in the combinations, constructions and arrangements of parts herein described and claimed.

Generally the invention comprises a portable grandstand including a wheel supported platform, a forwardly extending telescoping platform and a a rearwardly extending telescoping platform. Stringers are detachably secured to the sides of the wheel supported platform and each of the telescoping platforms and extend downwardly from one side of the said platforms and upwardly from the other. Props are supplied for the outer ends of the upwardly extending stringers and rails are mounted atop each of the stringers. A pair of supplemental platforms is provided for each of the telescoping platforms and for the wheel supported platforms and these are normally mounted upon the wheel supported platform in stacked relation but are movable to the rails mounted atop the stringers. The apparatus when not in use presents a compact wheel-supported mass which may be moved from place to place in the manner of a trailer but when in use provides a grandstand which is three times the width and three times the length of the wheel-supported platform. Means is provided for quickly assembling and disassembling the apparatus from one of its conditions to another.

It is accordingly an object of the invention to provide a novel portable grandstand.

Another object of the invention is to provide an apparatus of the character set forth which is simple in construction, comparatively inexpensive to manufacture, easy to assemble and disassemble and yet effective and efficient in use.

Another object of the invention is the provision of an apparatus of the character set forth which may be assembled and disassembled as a grandstand with a minimum of manpower effort.

A still further object of the invention is the provision of an apparatus of the character set forth in which various sections, forming parts of the invention, may be moved into and out of their grandstand positions by means of a caster and rail structure forming a part of the invention.

Other and further objects of the invention will become apparent from a reading of the following specification taken in conjunction with the drawings, in which:

Figure 1 is a side elevational view of an embodiment of the invention,

Figure 2 is an end elevational view thereof,

Figure 3 is an end elevational view similar to Figure 2 but taken from the opposite end of the apparatus and showing certain supplementary platforms forming part of the invention in their extended positions, Figure 4 is a fragmentary rear elevational view illustrating a prop utilized in the invention, Figure 5 is a plan view of the apparatus as it appears when in use as a grandstand, Figure 6 is a fragmentary perspective view of a supplemental platform utilized in the invention and illustrating certain collapsible seats which form a part of the invention, Figure 7 is a perspective view, partly broken away, of a wheel supported platform and a pair of telescoping platforms both forming parts of the invention together with certain stringers also forming parts of the invention mounted in the positions they assume when the apparatus is utilized as a grandstand.

Figure 8 is a sectional view taken substantially along line 8—8 of Figure 7,

Figure 9 is a sectional view taken along line 9—9 of Figure 8,

Figure 10 is a view similar to Figure 8 but showing the apparatus in retracted position.

Figure 11 is a fragmentary perspective view of one corner of a telescoping platform forming a part of the invention, Figure 12 is an enlarged fragmentary sectional view taken substantially along line 12—12 of Figure 5, Figure 13 is a fragmentary end elevational view of a supplementary platform forming a part of the invention, Figure 14 is a plan view of the portion of the invention illustrated in Figure 13, Figure 15 is a fragmentary sectional view taken substantially along line 15—15 of Figure 14, Figure 16 is an exploded perspective view illustrating certain supporting members forming a part of the invention, Figure 17 is an enlarged fragmentary sectional view taken substantially along line 17—17 of Figure 5 and showing a certain seat structure in raised position, Figure 18 is a view similar to Figure 17 but showing the seat structure in collapsed condition, and Figure 19 is a sectional view taken along line 19—19 of Figure 12.

Referring more particularly to the drawings, there is shown therein a central or wheel-supported platform 10 in which is telescopically mounted a rearwardly extensible telescopic platform 11 and a forwardly extensible telescopic platform 12, the latter being telescopically receivable in the platform 11 when the grandstand is in collapsed condition.

The platform 10 is supported at one end by permanently mounted supporting wheels 13 mounted upon an axle 14 carried at the lower end of a bracket 15 affixed to the underside of the platform 10 and at the other end the platform 10 is supported by retractable wheels 16 which are mounted at the free end of a yoke 17 which is pivotally connected, as indicated at 18, to the underside of the platform 10.

Each of the platforms 10, 11 and 12, when in their extended positions may be supported by means of a jack 19 at each corner thereof. Each of the platforms 10, 11 and 12 is provided with a plurality of spaced slots 20 adjacent each of its longitudinal edges, these slots 20 being three in number along each side of each of the platforms mentioned in the present showing of the invention.

For one of the aligned sides of the extended platforms 10, 11 and 12 there is provided a series of downwardly and outwardly extending stringers 21 each of which is provided with an upwardly extending hook 22 which is engageable in one of the slots 20. Each of the stringers 21 has affixed to its top side a trackway 23 provided with an abutment 24 at its outer end and with a pivoted section 25 at its inner end. The pivoted section 25 is adapted to rest against the upper edge of its associated platform when the stringer hook 22 is engaged in its slot 20.

For the other aligned edges of the platforms 10, 11 and 12 there is provided a series of stringers 26 which are adapted to extend upwardly and rearwardly, as shown, for example, in Figure 3 of the drawings. The stringers 26 are provided at their inner ends with upwardly extending hooks 27 which are each engageable in one of the slots 20 and the outer end of each of the stringers 26 is provided with a prop generally indicated at 28 and best illustrated in Figure 4 and which props 28 each consist of a pair of downwardly and outwardly extending legs 29 interconnected adjacent their upper ends with a cross bar 30 and interconnected adjacent their lower ends by a cross bar 31. A trackway 32 is affixed to the top side of each of the stringers 26 and is provided with an abutment 33 at the outer end thereof and with a pivoted portion 34 at the inner end thereof, the latter resting against the side of the associated platforms 10, 11 and 12 as the case may be.

Six supplementary platforms 36 are provided and each has affixed upon the bottom thereof spaced transversely extending rows of casters 37. When the apparatus is not in use, the supplementary platforms 36 may be stacked upon the wheel supported platform 10, as best indicated in Figures 1 and 2 of the drawings. A pair of hydraulically operated lifting arms 38 is mounted upon each of the longitudinal sides of the wheel supported platforms 10. The lifting arms are supplied with hydraulic power through a cylinder 39 and suitable controls (not shown).

Horizontally extending rows of collapsible seats are mounted atop each of the supplementary platforms 36 and each row is provided with a plurality of support members 41 each pivotally mounted, as indicated at 42 in a bracket 43 which brackets are, in turn, affixed to the upper side of the platforms 36 each of the support members 41 is provided with a transversely extending opening 44 and the bracket 43, which is U-shaped in horizontal cross sectional area has pivoted thereto, as indicated at 45, a U-shaped extension 46 provided with a pair of openings 47 adjacent its outer end. A bolt 48 is provided and is adapted to be extended through the openings 47 and the opening 44 to lock the support members 41 when the same are moved to their vertical positions, as shown, for example, in Figure 3 of the drawings.

In operation, it will be apparent that the entire apparatus, when in collapsed condition, may be drawn from place to place by a tractor or the like in the manner of a conventional trailer, the wheels 13 being utilized for supporting the same when in such position and the wheels 16 being retracted to the dotted line position shown in Figure 1 at this time.

When, however, it is desired to extend the apparatus and utilize the same as a grandstand, it is only necessary to first extend forwardly the telescopic platform 12 and rearwardly the telescopic platform 11 after which the jacks 19 may be moved downwardly in conventional manner to securely anchor the apparatus to the ground. Thereafter the stringers 21 may be attached to the platforms 10, 11 and 12 along one of the aligned edges thereof and the stringers 26 attached to the other aligned edges of the platforms 10, 11 and 12 by means of the hooks 22 and 27, respectively, and the props 28 mounted beneath the outer portions of the stringers 26 to support the latter.

Thereafter the hydraulic lifting arms may be engaged beneath that one of the supplementary platforms 36 which is next to the bottom and hydraulically apply pressure to lift the same and those platforms which are mounted thereover thus freeing the lowermost of the supplementary platforms 36 whereupon it may be rolled by means of casters 37 either forwardly or rearwardly to a position upon the platform 12 or the platform 11 as the case may be and thereafter the same may be rolled outwardly and downwardly upon the trackways 23 until the abutments 24 prevent further outward movement or may be rolled upwardly and outwardly upon the trackways 32 until the abutments 33 prevent further outward movement. This procedure may be repeated until all of the supplementary platforms 36 are in their designated positions as shown in Figure 5 of the drawings after which the rows of seats may be moved to their operative positions and locked in such positions by means of the bolts 48 aforesaid.

While but one form of the invention has been shown and described herein, it will be readily apparent to those skilled in the art that many minor modifications may be made without departing from the spirit of the invention or the scope of the appended claims.

I claim:

1. A portable grandstand comprising a wheel-supported platform, telescoping platforms extensible forwardly and rearwardly from the wheel-supported platform, stringers detachably secured to the sides of said platforms and extending laterally therefrom, a pair of supplemental platforms for each of the telescopic platforms and for the wheel-supported platform removably mounted upon the stringers, one at each side of the said wheel-supported and telescoping platforms, the laterally extending supplemental platforms being adapted to support seats, said supplemental platforms on one side of the wheel-supported and telescoping platforms declining from the edges thereof to the ground and the supplemental platforms at the other side extending angularly and upwardly from the edges of said wheel-supported platform and said telescoping platforms and props for supporting the stringers on said other side of the wheel-supported and telescoping platforms.

2. A portable grandstand comprising a wheel-supported platform, telescoping platforms extensible forwardly and rearwardly from the wheel-supported platform, stringers detachably secured to the sides of the said platforms and extending laterally therefrom, said stringers at one side of said platforms extending angularly downwardly therefrom and said stringers at the other side of said platforms extending angularly and upwardly therefrom, props for the outer ends of the stringers along one side of said grandstand, rails mounted atop each of said stringers, a pair of supplemental platforms for each of the telescopic platforms and for the wheel-supported platform, removably mounted upon the rails, one at each side of said wheel-supported and telescoping platforms, and casters affixed to the bottom of each of said supplemental platforms and engageable in said rails.

CALVIN J. HOLMES.

REFERENCES CITED

The following references are of record in the file of this patent:

UNITED STATES PATENTS

| Number | Name | Date |
|---|---|---|
| 1,301,107 | Curtis | Apr. 22, 1919 |
| 1,433,547 | Hadden | Oct. 31, 1922 |
| 2,127,580 | Bartholowsky | Aug. 23, 1938 |
| 2,136,130 | Gorlenko | Nov. 8, 1938 |
| 2,298,530 | Fletcher | Oct. 13, 1942 |